A. B. HULSEBOS AND G. DEN BESTEN.
PLOW SAFETY HITCH.
APPLICATION FILED DEC. 30, 1920.
1,391,058.
Patented Sept. 20, 1921.
3 SHEETS—SHEET 3.
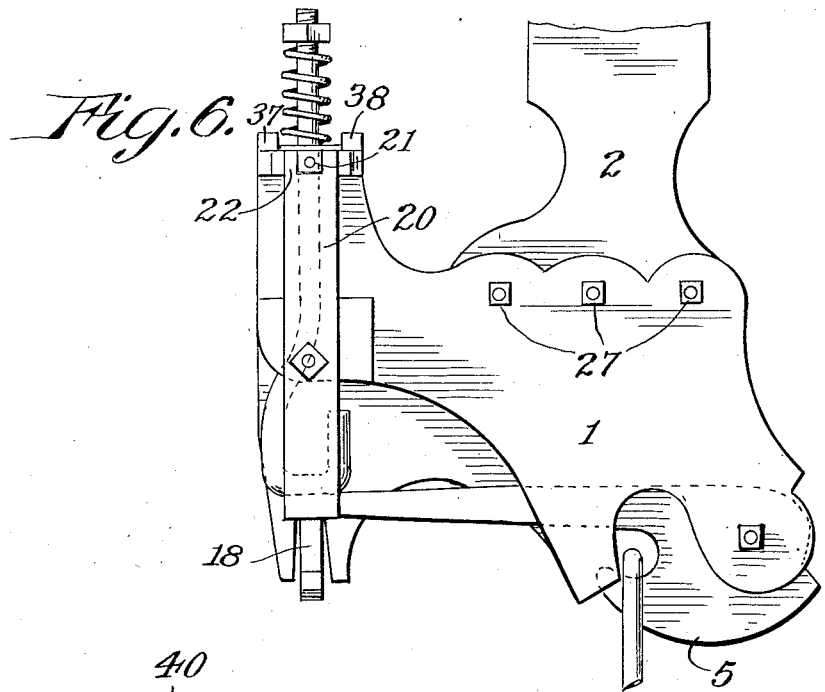
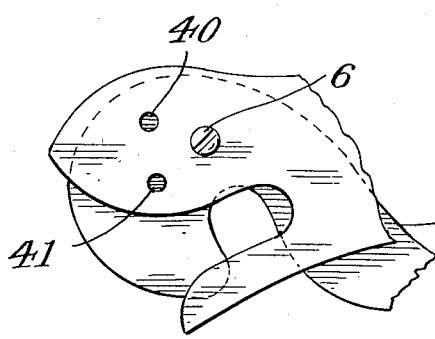
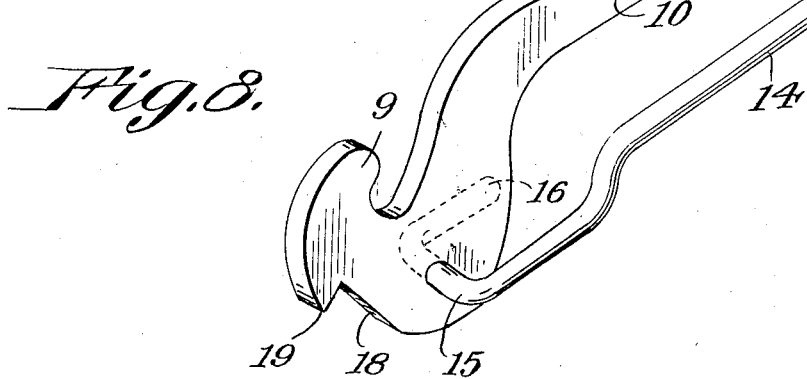

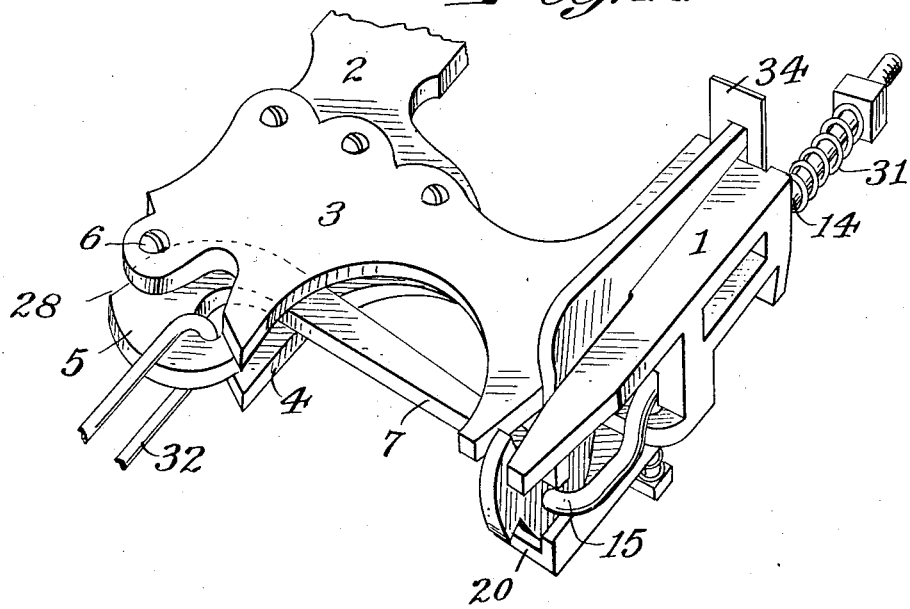
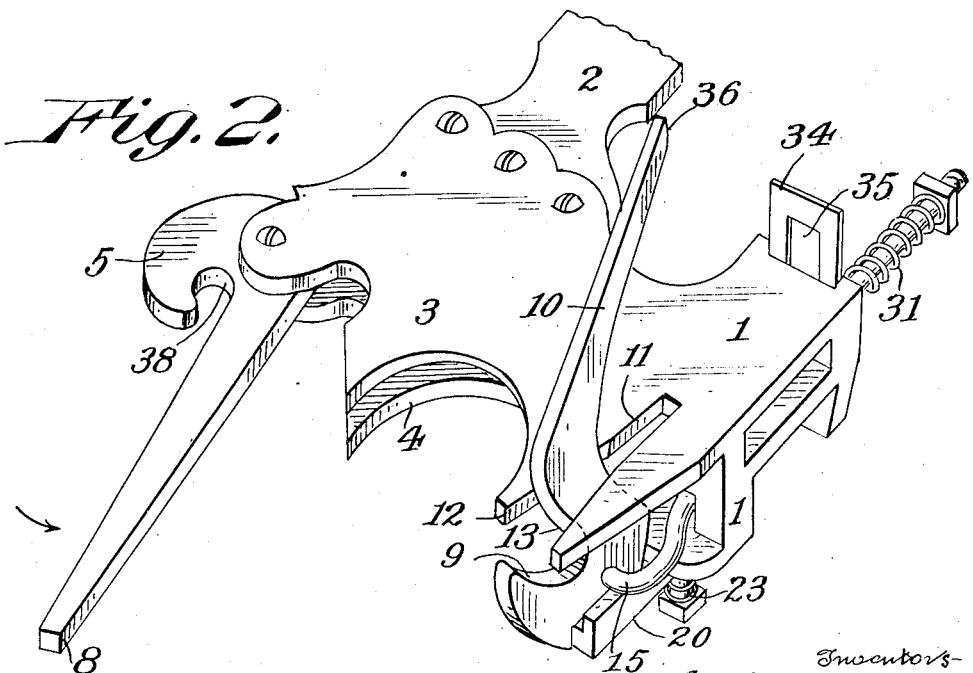

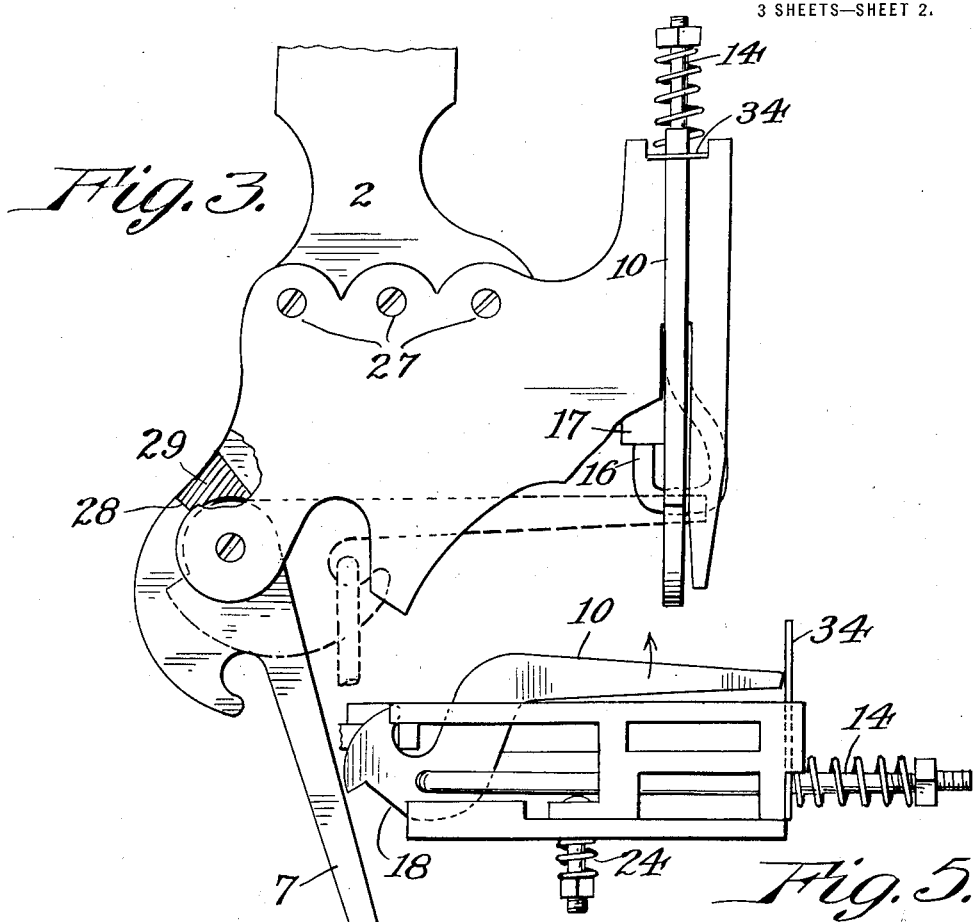
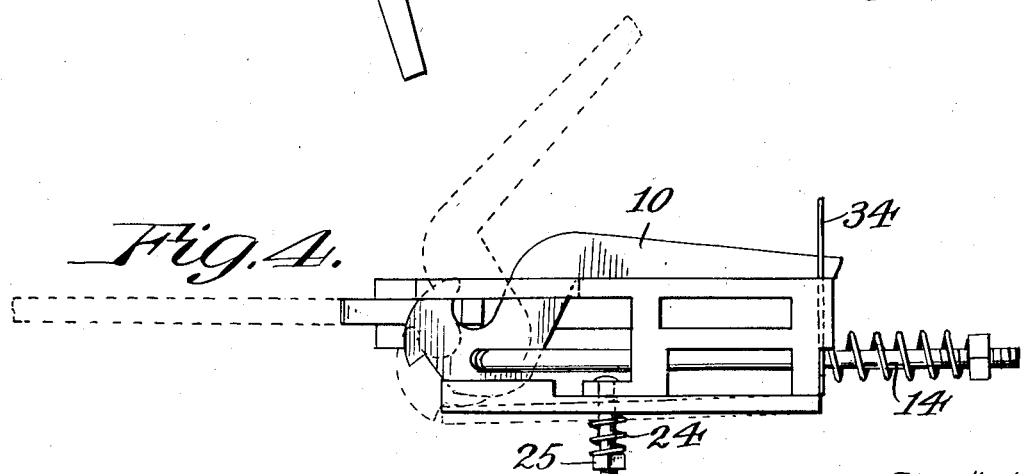

UNITED STATES PATENT OFFICE.

ALBERT B. HULSEBOS AND GERRIT DEN BESTEN, OF HOLLAND, MICHIGAN, ASSIGNORS TO SAFETY RELEASE CLEVIS CO., OF HOLLAND, MICHIGAN, A CORPORATION OF MICHIGAN.

PLOW SAFETY-HITCH.

1,391,058.   Specification of Letters Patent.   Patented Sept. 20, 1921.

Application filed December 30, 1920. Serial No. 433,974.

*To all whom it may concern:*

Be it known that we, ALBERT B. HULSEBOS and GERRIT DEN BESTEN, citizens of the United States, residing at Holland, county of Ottawa, and State of Michigan, have invented a certain new and useful Plow Safety-Hitch, of which the following is a specification.

Our invention relates to that class of devices which are desiged to connect a source of power such as a tractor or horses to a plow or other agricultural instrument, and which has for its object to provide a device which when the plow strikes a stone embedded in the soil, or a stop, or any obstruction that would result in damage to the plow, the hitch automatically releases the pull power from the plow, thus avoiding all possibility of damage to the latter.

Numerous devices of this kind have been devised which are subject to one or more objections. There is the older and more commonly employed frangible pin which is inserted in a hole and has bearing against it one end of a hook to which the clevis of a tractor is attached. When the plow strikes an obstacle, the frangible pin breaks and releases the tractor. This requires quite a little time to drive out the old pin which necessarily becomes wedged into the holes with a considerable degree of tightness, and then a new pin has to be inserted causing a delay which is quite objectionable.

Another type is where the resistance to the opening of the hook is caused by friction exerted generally through the medium of bolts clamping the holding members tightly between them. This type is objectionable because of the fact that it is almost, if not always, impossible to determine at what moment the hitch will let go, the amount of pull varying considerably, so that it is difficult to tell whether the device will operate properly or not.

Another type is formed by those devices in which the hook is held in position by means of a spring. These devices are generally objectionable because of the great difficulty of recoupling. Necessarily the spring employed to carry the strain of a pull tractor is very stiff and a very different piece of work to recouple many of this type of hitch. Some attempts have been made to remedy this by providing pins which can be withdrawn after the device has been uncoupled and then after it is recoupled, the pin inserted again.

Another difficulty with devices of this kind is that if an adjustment is provided for the spring so as to regulate the amount of tension and consequent pull which the hitch will resist, the distance into which the latch will enter the holder varies as the spring is tighter or looser. This necessitates loosening the spring in order to recouple. In some instances attempts have been made to remedy this condition by providing for telescopic adjustments on the latch so as to lengthen or shorten it as the case may be.

Another feature which has caused a great deal of trouble in devices of this character is due to the difficulty of providing a straight true pull on the plow beam. We are aware that there have been devices made in which this difficulty has been sought to be overcome by bolting a plow beam between two plates, and while this is all right for a time, in practice and with constant twisting and pulling, the plates work loose and it is not long before the twist is imparted to the beam of the plow, which is a very undesirable result.

Our invention has for its object to provide a device in which the amount of engagement with the latch holding member will remain the same regardless of the tension of the spring, and has for its further object to provide a construction in which the plow beam will be held between two arms cast from a single piece of metal so that there is no possibility of either arm twisting or working loose.

It has for its further object to provide a construction in which the resistance to the pull will be direct upon the spring, thereby avoiding all frictional engagement with its resultant deleterious effect, due to the wear of the parts, and thus enable the user to determine with a considerable degree of nicety, the exact pounds pull which the hitch is capable of resisting.

It has for its further object to provide means to hold the parts in position so that the tractor can back into the hitch and it will automatically recouple.

It has for its further object to provide a construction which will make it possible to use one hitch for a variety of purposes. At present hitches of this type are not available for all purposes, that is, if a hitch is made for two plows, it cannot be used for a larger number by reason of the necessity for providing for greater number of pounds pull before the hitch is released.

In the devices hereinafter described, it will be apparent that by a slight change on the device without altering or substituting any parts of the hitch, the same hitch can be used for a very wide variety of pounds pull.

Other features of the invention will appear from the hereinafter contained description and claims.

The drawings which are hereto annexed are a part of this specification, are furnished for the purpose of disclosing a concrete embodiment of our invention, and are furnished solely for illustrative purposes, it being recognized by us and will be apparent to persons skilled in the art, that many changes in the specific construction herein illustrated and described, may be made, all of which would be within the scope of our invention.

We therefore do not desire to be understood as limiting ourselves to the exact details of construction herein shown and described, except as such limitations as may appear in the hereinafter contained claims.

In the drawings, Figure 1 is an isometric perspective of our improved hitch coupled up to the clevis.

Fig. 2 is a similar view after the hitch has been released.

Fig. 3 is a top or plan view of the hitch with the clevis coupled, the hook being shown in dotted lines when it has released the clevis.

Fig. 4 is an end view from the latch end of the device showing the hook and latch in a released position by dotted lines.

Fig. 5 is a similar view with the latch closed.

Fig. 6 is a bottom view of the device.

Fig. 7 is a fragmentary detail view of the means for varying the pound pull required to release the hitch.

Fig. 8 is an enlarged detail view of the latch and the spring carrying the bolt upon which it is pivoted.

Similar reference numerals refer to similar parts throughout the entire description.

As shown in the drawings, we have illustrated only a fragmentary portion of the plow beam 2 as obviously it forms no part of our invention. It is securely fastened between the arms 3 and 4 by means of bolts 27 to a casting 1 which forms a main body portion. This main casting 1 is formed with two laterally extending arms 3 and 4 which are in spaced relation to each other. Intermediate these arms is mounted a hook 5 which is rotatably upon a pin or pivot 6 secured in the said arm adjacent their ends. The hook 5 is provided with a shoulder 28 which is adapted to contact with a detent 29 formed on the casting 1 so as to prevent the arm 7 swinging beyond the position indicated in Fig. 3. The arm 7 extends from the hook 5 at right angles to the pivot 6, its outer end 8 engaging a detent 9 formed on a latch 10 which is mounted in a slot 11 formed in the other end of the casting 1. This slot 11 is preferably provided with two outwardly tapering walls 12 and 13 to permit the latch to freely enter therein.

A bolt 14 is mounted in the casting 1 so that it is slidable in one direction but not in the other. A portion 15 of the bolt 14 forms a pivot 15 about which the latch 10 swings, this pivot 15 being at right angles to the pivot 6. The end 16 of the bolt 14 is engaged by a shoulder or lug 17 formed on the casting 1 so as to prevent its rearward movement, although it is free to move forwardly except as the movement is resisted by a spring 31 which is mounted on the bolt 14. The lower part 18 of the latch 10 adjacent the pivot 15 is flattened as clearly seen in Fig. 8 of the drawings and is provided with a detent 19 which engages the forward end 21 of a movable plate 20 upon which the latch rests. The plate 20 is loosely secured to the bottom of the casting 1 below the latch 10 by means of a bolt 22, though any other suitable or desired means of loosely holding the plate may be employed.

Near the forward end of the casting 1 is mounted a bolt 23 which passes through the plate 20 and carries a coil spring 24, the tension of which is regulated by a nut 25 threaded on the bolt. This spring serves to regulate the amount of tension existing between the latch 10 and the plate 20 as the former swings upon its pivot 15.

A nut 30 is threaded upon the outer end of the bolt 14 and is provided in order to adjust the tension of the coil spring 31 which is mounted intermediate the nut 30 and the rear wall of the casting 1. Intermediate the end of the coil spring 31 and the casting 1 is mounted a catch 34 which is provided with a central opening 35 which is adapted to receive the end 36 of the latch 10. This catch is held between two shoulders 37 and 38 formed on the main casting 1 which prevent its lateral displacement, and its lower end extends just beyond the bolt 14 which passes through it.

The result of this arrangement is that the catch 34 can move the required distance to permit the end 36 of the latch 10 to enter the opening 35 in the catch without the necessity of any very great pressure being exerted upon the spring 31, the amount of leverage being so great that a scarcely perceptible amount of movement of the spring is necessary to permit the catch to engage and hold the latch in position. The end 36 of the latch 10 is preferably rounded or beveled so that when it strikes the catch 36, it will swing it outwardly to permit its movement downward until the end 36 is in a position to enter the opening 35 in the catch.

The operation of the device is as follows:

The tractor is secured to the hook 5 by means of a coupling 32, a fragmentary portion only being shown as seen in Fig. 1. It will be apparent that this coupling is in direct line with the plow beam 2. Any pull upon this coupling will, through the medium of the arm 7 exert a direct straight pull upon the bolt 14 and tend to compress the spring 31 which spring is adjusted so that its tension will be equal to the normal draft or pull of the plow. In the event however, that the plow should strike a stone, stump, or other obstruction which would tend to break the plow, the moment that the pull upon the bolt 14 is in excess of the normal draft, the spring 31 will be compressed, the latch will be moved outwardly becoming disengaged from the catch 34, when it will automatically tilt upward as shown clearly in Fig. 2 and in the dotted lines in Fig. 4. This will release the arm 7 and the hook 5 will swing upon its pivot releasing the coupling 32 from it, but owing to the presence of the shoulder 28 on the hook 5, it can not move past the point when it will abut against the shoulder 29. Now if the latch were loosely mounted upon the pivot 15, the tendency would be, the moment that it was released from the catch 34, it would fly clear over and get out of position. This however, is prevented by means of the shoulder 19 contracting with the end of the plate 20.

Practice has shown that this shoulder will contact so violently with the plate 20 that it will cause the latch to be thrown back and to again engage the catch 34. We avoid this objectionable result by providing for the regulation of the pressure exerted upon the bottom part of the latch 10 by the plate 20, for when the shoulder 19 engages the end of the plate 20, the flattened portion 10 of the latch will rest upon the plate 20 and the pressure of the spring 24 will be sufficient to hold it in that position which is clearly shown in Fig. 2, and we provide for the adjustment of this pressure by increasing the tension of the spring 24 by tightening the nut 25.

So far, the device as described is a complete and operative device for automatically releasing a plow when it is in danger of being broken by striking against obstructions and it will be noted that we have materially shortened the hook 5 in its engagement with the coupling 32, which is a very desirable improvement.

As already pointed out, one of the chief difficulties of these devices is that of resetting them in order to again couple the plow up, but the device as thus described and as clearly illustrated in Fig. 2 is now in position to automatically recouple without any manual operation whatever being required. The tractor is simply backed up, the coupling 32 striking the hook 5 in the notch 38 formed in it, and this will swing the arm 7 in the direction indicated by the arrow in Fig. 2, causing the end 8 of the arm to strike against the latch 10 just above the detent 9 and below the upper arm 3 of the casting 1. This will swing the latch 10 upon its pivot 15 and it will pass into the slot 11 until the beveled end 36 contacts with the catch 34 which it will push backward until the end 36 enters the opening 35 in the catch, when the hitch will be in position to again draw its normal load.

It will be apparent to persons skilled in the art, from the foregoing description, that we have greatly increased the amount of leverage required to compress the spring 31 and release the latch and in turn the hook 5 from the coupling 32, thus permitting the use of a much lighter spring than would ordinarily be required for this purpose, and by providing a nut 30 for adjustment, the tension of the spring can be regulated to a degree, but not sufficiently to enable it to carry, for example, four times as many plows; that is to say, if the device were constructed for two plows, it would be impossible under normal circumstances to adjust the spring so that it would carry eight plows.

We however, provide for this by the construction shown in Fig. 7 in which we have located two additional holes 40 and 41 in which the pivot pin 6 may be mounted. The result of this is that placing the pivot pin 6 in the hole 40 will increase the leverage to four times as much as when it is in the position shown in the drawings, while to place it in the hole 41 will increase it one and one-half times.

We are thus able by this construction, to utilize the same hitch for a very wide range of pulling effort. This is particularly desirable from the dealers' standpoint as it avoids the necessity of carrying in stock so many different sizes of hitches for various uses.

It will also be apparent from the foregoing description that regardless of the amount of tension which is placed upon the spring 31 that the bolt 14 cannot move any farther back by reason of the fact that the end 16 thereof contacts with the shoulder 17. Therefore, it is impossible for the end 36 of the latch 10 to extend any farther through the opening 35 in the catch 34 than normally. Consequently, any necessity for adjusting the length of this latch is entirely obviated.

Having described our invention what we regard as new and desire to secure by Letters Patent is:

1. An automatic release comprising a main body portion, a hook pivotally attached thereto, spring actuated means to hold said hook in a closed position which means release it at a predetermined pull, means to hold the released parts in position to be automatically reëngaged when pressure is exerted against said hook in a reverse direction.

2. An automatic release comprising a main body portion, a hook pivotally attached thereto, spring actuated means to hold said hook in a closed position which means release it at a predetermined pull, spring actuated means to hold the released parts in position to be automatically reëngaged when pressure is exerted against said hook in a reverse direction.

3. An automatic release comprising a main body portion, a hook pivotally attached thereto, spring actuated means to hold said hook in a closed position which means release it at a predetermined pull, means to hold the released parts in position to be automatically reëngaged when pressure is exerted against the said hook in a reverse direction, and means to adjust the tension of the springs.

4. An automatic release comprising a main body portion, a hook pivotally attached thereto, spring actuated means to hold said hook in a closed position which means release it at a predetermined pull, spring actuated means to hold the released parts in position to be automatically reëngaged when pressure is exerted against said hook in a reverse direction, and means to adjust the tension of the springs.

5. An automatic release comprising a main body portion, a pivot therein, a hook on said pivot, spring actuated means to hold said hook in a closed position, means to prevent said hook swinging on said pivot beyond a predetermined position when released, and spring actuated means to hold the released parts in position to automatically reëngage when pressure is exerted against said hook in a reverse direction.

6. An automatic release comprising a main body portion, a pivot therein, a hook on said pivot, spring actuated means to hold said hook in a closed position, means to prevent said hook swinging on said pivot beyond a predetermined position when released, spring actuated means to hold the released parts in position to automatically reëngage when pressure is exerted against said hook in a reverse direction, there being means to vary the leverage exerted by said hook.

7. An automatic release for plows comprising a body portion having two arms, a plow beam being bolted intermediate said arms, a pivot in said body portion, a hook mounted thereon adjacent the ends of said arms, an arm on said hook, a latch engaged by said arm, a spring which holds said latch normally closed, a pivot for said latch at right angles to the first pivot, means to prevent the tightening of the tension of said spring from pulling the latch pivot back.

8. An automatic release for plows comprising a body portion having two arms, a plow beam being bolted intermediate said arms, a pivot in said body portion, a hook mounted thereon adjacent the ends of said arms, said beam and hook being in line, an arm on said hook, a latch engaged by said arm, a spring which holds said latch normally closed, a pivot for said latch at right angles to the first pivot, means to prevent the tightening of the tension of said spring from pulling the latch pivot back, and means to prevent the latch opening beyond a predetermined point.

9. An automatic release comprising a main body portion having two arms, a hook pivotally attached adjacent one end and intermediate said arms, an arm formed on said hook extending therefrom at right angles to said pivot, there being a slot in said body portion adjacent its other end, a latch which swings in said slot, a bolt slidably mounted in said body portion, a loop on said bolt which forms a pivot for said latch, the axis of said pivot being at right angles to the first-named pivot, a spring on said bolt, a nut to regulate its tension, a catch having an opening therein mounted intermediate the inner end of said spring and the body portion, which opening engages the end of said latch when the hook arm is held thereby, a plate detachably secured to said body portion below said latch, means to regulate the friction between said plate and the lower portion of the latch.

10. An automatic release comprising a main body portion having two arms, a hook pivotally attached adjacent the end and intermediate said arms, an arm formed on said hook extending therefrom at right angles to said pivot, there being a slot in said body portion adjacent its other end, a latch which swings in said slot, a bolt in said body portion slidable in one direction but not in the other, a loop on said bolt which forms a pivot for said latch, the axis of said pivot being at right angles to the first-named pivot, a spring on said bolt, a nut to regulate its tension, a catch having an opening therein mounted intermediate the inner end of said spring and the body portion, which opening engages the end of said latch when the hook arm is held thereby, a plate detachably secured to said body portion below said latch, means to regulate the friction between said plate and the lower portion of the latch.

11. An automatic release comprising a main body portion having two arms, a hook pivotally attached adjacent one end and intermediate said arms, an arm formed on said hook extending therefrom at right angles to said pivot, there being a slot in said body portion adjacent its other end, a latch which swings in said slot, a bolt slidably mounted in said body portion, a loop on said bolt which forms a pivot for said latch, the axis of said pivot being at right angles to the first-named pivot, a spring on said bolt, a nut to regulate its tension, a catch having an opening therein mounted intermediate the inner end of said spring and the body portion, which opening engages the end of said latch when the hook arm is held thereby, a plate detachably secured to said body portion below said latch, a bolt which extends through said plate, a spring on said bolt, and a nut to vary the tension of said spring.

12. An automatic release comprising a main body portion having two arms, a hook pivotally attached adjacent one end and intermediate said arms, an arm formed on said hook extending therefrom at right angles to said pivot, means to prevent the hook from swinging beyond a predetermined point, there being a slot in said body portion adjacent its other end, a latch which swings in said slot, a bolt slidably mounted in said body portion, a loop on said bolt which forms a pivot for said latch, the axis for said pivot being at right angles to the first-named pivot, a spring on said bolt, a nut to regulate its tension, a catch having an opening therein mounted intermediate the inner end of said spring and the body portion, which opening engages the end of said latch when the hook arm is held thereby, a plate detachably secured to said body portion below said latch, means to regulate the friction between said plate and the lower portion of the latch.

13. An automatic release comprising a main body portion having two arms, a hook pivotally attached adjacent one end and intermediate said arms, an arm formed on said hook extending therefrom at right angles to said pivot, there being a slot in said body portion adjacent its other end, a latch which swings in said slot, a bolt slidably mounted in said body portion, a loop on said bolt which forms a pivot for said latch, the axis of said pivot being at right angles to the first-named pivot, a spring on said bolt, a nut to regulate its tension, a catch having an opening therein mounted intermediate the inner end of said spring and the body portion, which opening engages the end of said latch when the hook arm is held thereby, a plate detachably secured to said body portion below said latch, means to regulate the friction between said plate and the lower portion of the latch, and means to maintain a uniform point of engagement between the latch and the plate.

14. An automatic release comprising a main body portion having two arms, a hook pivotally attached adjacent one end and intermediate said arms, an arm formed on said hook extending therefrom at right angles to said pivot, there being a slot in said body portion adjacent its other end, a latch which swings in said slot, a bolt slidably mounted in said body portion, a loop on said bolt which forms a pivot for said latch, the axis of said pivot being at right angles to the first-named pivot, a spring on said bolt, a nut to regulate its tension, a catch having an opening therein mounted intermediate the inner end of said spring and the body portion, which opening engages the end of said latch when the hook arm is held thereby, a plate detachably secured to said body portion below said latch, means to regulate the friction between said plate and the lower portion of the latch, means to prevent the latch swinging beyond a predetermined point, and means to maintain a uniform point of engagement between the latch and the plate.

15. An automatic release for plows comprising a body portion having two arms in spaced relation, a plow beam being bolted intermediate said arms, a hook pivotally mounted intermediate said arms in direct line with the plow beam, an arm formed on said hook and extending at right angles to the pivot, a latch which holds said hook normally closed, a bolt, a hook at the end of said bolt, said hook forming a pivot for the latch, a spring which normally holds the latch in engagement with the hook arm in arrangement so that a predetermined pull on the hook exerts a straight pull on the spring, and means which holds said parts in position to be automatically reengaged by pressure on the hook in a reverse direction.

16. An automatic release mechanism comprising a main body portion, a hook pivoted thereto, spring actuated mechanism for locking the hook, automatically releasable at a predetermined pressure, and means to retain the parts in position to automatically relock when reverse pressure is applied to the hook.

In testimony whereof, we have signed the foregoing specification.

ALBERT B. HULSEBOS.
GERRIT DEN BESTEN.